(12) United States Patent
Schiff

(10) Patent No.: US 8,457,021 B2
(45) Date of Patent: Jun. 4, 2013

(54) REPEATER SYSTEM

(75) Inventor: Yoni Schiff, Or Yehuda (IL)

(73) Assignee: Cellvine Ltd., Or Yehuda, IL (US)

( * ) Notice: Subject to any disclaimer, the term of this patent is extended or adjusted under 35 U.S.C. 154(b) by 260 days.

(21) Appl. No.: 12/903,272

(22) Filed: Oct. 13, 2010

(65) Prior Publication Data
US 2011/0085477 A1    Apr. 14, 2011

Related U.S. Application Data

(60) Provisional application No. 61/251,376, filed on Oct. 14, 2009, provisional application No. 61/251,744, filed on Oct. 15, 2009.

(51) Int. Cl.
*H04B 7/14* (2006.01)

(52) U.S. Cl.
USPC ............................................ 370/279

(58) Field of Classification Search
None
See application file for complete search history.

(56) References Cited

U.S. PATENT DOCUMENTS
2009/0291632 A1* 11/2009 Braithwaite et al. ............ 455/7
* cited by examiner

*Primary Examiner* — Chirag Shah
*Assistant Examiner* — Minh-Trang Nguyen
(74) *Attorney, Agent, or Firm* — Soroker-Agmon

(57) ABSTRACT

A repeater system for wireless communication system is disclosed forthwith. The repeater system uses an analog frequency converter and digital down and up converter in order to allow the processing of the repeated signal in a relatively low frequency (in the 30 MHz range) and in a digital form (rather than in analog form). The repeater system also provides a programmable multi-band filter which can identify and suppress out of band noises to increase the signal-to-noise ratio of the system.

6 Claims, 6 Drawing Sheets

REPEATER SYSTEM

REFERENCE TO CROSS-RELATED APPLICATION

This application claims priority from US provisional patent application No. 61/251,376, filed on Oct. 14, 2009 and US provisional patent application No. 61/251,744, filed on Oct. 15, 2009, both herein incorporated by reference in its entirety.

FIELD OF THE INVENTION

The present invention relates to wireless communication systems, more particularly, to repeater systems for wireless communication systems.

BACKGROUND OF THE INVENTION

Wireless technologies such as cellular, Personal Communication Systems (PCS), Multiuser Multipath Distribution Systems (MMDS), Wireless Local Loop (WLL) etc. have inherently limited ranges dependent upon transmitting power, antennas gain, path loss, noise, data rate, etc. In locations where wireless connectivity is required, yet the reception signal power is low, the use of repeaters is prevalent.

Repeaters are bi-directional amplifier devices that receive a low power signal using the receiving (Rx) antenna (first antenna), amplify it and then re-transmit the signal using a higher power signal via a transmitting (Tx) antenna (second antenna). Many repeaters also filter out the noise from the received signal in order to get a clean transmission signal.

Every repeater employs at least two antennas: a receiving antenna (also known as "donor" antenna) which communicates with the networks base stations and a transmitting antenna (also known as "service" antenna) which communicates with the remote stations and subscribers. Having these two antennas in proximity to each other may create a feedback loop when the signal that is transmitted from the "service" is received by the "donor" antenna, filtered, amplified and then transmitted again by the "service" antenna. This creates a positive feedback loop, which causes interferences and disruptions to the regular transmissions, in some cases this can jam nearby cellular base station receivers (BTS's).

In order to avoid a feedback loop, it is required to have a margin of about 10-15 dB between the isolation between the antennas and the repeater gain. For example, if the isolation between the antennas is 65 dB, the maximum gain of the repeater needs to be less than 50-55 dB.

Isolation between the antennas is usually achieved by physically separating the antennas. The "donor" antenna is sometimes installed outside of the area where the repeater is located, which may lead to problems due to wall penetrations and zoning issues. Even when no external antennas are used, separating the antennas may require physical separation of at least 2 meters.

Another option used to overcome the feedback loops is by using echo cancellation algorithms which estimate the feedback signal received by the "donor" antenna and subtracting it from the signal transmitted by the "service" antenna.

FIG. 1 of the prior art is a schematic block diagram of a first typical prior are repeater system (PARS) 10 which uses echo cancellation to overcome the feedback loop.

Prior to operation (and possibly periodically during operation) the prior art repeater system (PARS) 10 moves to a training mode in which a switch 116 connects a training signal generator 106 to a transmit (Tx) filter 108 instead of connecting an adder 114 to the Tx filter 108 (which is the normal, operational connection) and the training signal generator 106 transmits a training signal through the switch 116, the transmit (Tx) filter 108 and a digital-to-analog converter (DAC) 110 to a second antenna 216.

The training signal and a cancellation filter control 112 are also supplied to a cancellation filter 124 for use in the cancellation of the feedback signal.

Prior art repeater systems (PARS) 10 use white noise as the training signal. The PARS 10 sends out a White Noise signal, which essentially blocks out any communications in the vicinity of the PARS 10 until the estimation algorithm (usually located within the cancellation filter 124) converges.

The second antenna 216 transmits the training signal via the feedback channel 118 (which is normally the air). Some of the transmitted signals' power is received by a first antenna 214 and is supplied to an analog-to-digital converter (ADC) 102 and to a receive (Rx) filter 104. The filtered signal is then goes to an adder 114 which subtracts a cancellation signal coming from the cancellation filter 124. The result of the subtraction is fed back to the cancellation filter 124 to determine if adjustments to the cancellation signal are required.

In order to achieve the correct cancellation signal, the energy of the signal coming from the adder 114 must be minimized, this means that the estimated cancellation filter 124 is similar to the feedback path 118, when in full training mode since there is no real data signal being transmitted, the only signal received by the first antenna 214 should be the signal transmitted by the second antenna 216 which is the training signal. In cases where the incoming signals are sufficient, the incoming signals can be used for training.

Due to changes in the feedback channel 118, such as small movements of the antennas, changes in reflection elements such as moving trees or cars, it is required to perform the procedure described above periodically according to the physical requirements to maintain stability. Adaptive algorithms can be used to correct the transfer function in a continuous manner using the incoming signals.

A typical repeater includes transmissions in both directions, but for simplicity, only one direction was described herein and below.

Normally, the filters in the repeater systems (such as the Rx filter 104 and Tx filter 108) are designed to comply with telecommunication standards in a way which will minimize their impact on adjacent frequency bands and also have minimal impact on signal integrity, (minimal propagation delay and amplitude ripple). Such filters are typically band pass filters and the compliance requirements cause the filters to be very close to ideal filters. As most of the filters are implemented as Finite Impulse Response (FIR) filters, the resultant filters become very long and complex filters. As the cancellation filter 124 estimates the signal path from the splitting point 126, it needs to estimate these complex filters (Rx filter 104 and Tx filter 108) therefore, requiring it to be a very long and complex filter itself.

FIG. 2 of the prior art is an example of a first typical band-pass filter magnitude response graph, whose pass-band is 10 MHz, and which attenuates 40 dB in 200 KHz, and 60 dB in 300 KHz.

Such a filter may require 400 taps at a processing frequency of 50 MHz.

FIG. 3 of the prior art is an example of a second typical band-pass filter magnitude response graph, whose transition band is widened to 1 MHz, and may be implemented with 100 taps.

It is possible to see that this band-pass filter is further away from an ideal band-pass filter than the filter described in FIG. 2.

FIG. 4 of the prior art is an example of a second prior are repeater system (PARS) 10 which uses echo cancellation to overcome the feedback loop.

In this second example, the Tx filter 108 is placed after the digital-to-analog converter (DAC) 110 and is therefore an analog filter; typically, a Surface Acoustic Wave (SAW) filter.

The main advantage of SAW filters is that they are easy and relatively inexpensive to manufacture. Yet, since SAW filters are hard-wired by nature, it is impossible to change their profiles once they are built.

From the perspective of the cancellation filter 124, there is little difference (if any) between the two repeater systems depicted in FIG. 1 and FIG. 4, as the complexity of the Tx filter 108 remains high and requires that the cancellation filter 124 to be long and complex.

All of the prior art repeater systems operate at the native radio-frequency (RF) bands which are at the 0.7-5 GHz range. These high frequencies generally yield highly complex designs which can be difficult to implement.

None of the prior art repeater systems include a solution for a simple, inexpensive and programmable cancellation filter which can operate at relatively low frequencies.

There is therefore a need for a repeater system, which comprises a combination of all of the above characteristics and functions.

SUMMARY OF THE INVENTION

The background art does not teach or suggest a repeater system which includes a solution for a simple, inexpensive and programmable feedback cancellation filter, in addition to an adaptive algorithm that can use incoming signals for estimation and adaptation of the filter.

The present invention overcomes these deficiencies of the background art by providing a solution which splits the Tx filter into two separate Tx filters that are digital and can be programmed according to the user's needs as well as operating in a relatively low frequency range.

It should be noted that any measurements, values, frequencies and frequency ranges mentioned in the current patent application are indicative and exemplary only and are not used by any means to limit the use and scope of the current invention.

In the present invention, the incoming signal which is in the RF range of 700-2400 MHz is down-converted twice: first in an analog frequency converter in order to reduce the frequency to a range suitable for conversion to digital (in the intermediate frequency range IF of approximately 120 MHz), and then in a digital down-converter (after being digitized with an analog-to-digital converter (ADC)) to a frequency of approximately 30 MHz. Once the signal is digitized and down-converted, it is filtered to remove any noises and an echo cancellation signal is subtracted from the signal in order to remove any feedback echoes coming from the transmitting antenna. The resultant signal is then filtered by a configurable multi-band filter suitable for any multiple band-pass filter combination (according to the specific wireless communication bands and sub-band used) and then it goes through another transmit filter, a digital up-converter, and a digital-to-analog converter. Once in the up-converted frequency and back in analog form, the signal is converted back to its radio frequency range, amplified and transmitted by the transmitting antenna.

An estimation algorithm is used to estimate the optimal cancellation signal to be used in the subtraction phase and to control the training signal generator in order to have more flexibility in changing environmental conditions and wireless communication protocols.

The training signal, which can be either internal signal or the communication signals passing through the system, can be used for training and adaptation.

According to a first embodiment of the present invention there is provided a repeater system including: at least first antenna, an analog-to-digital converter (ADC), wherein the analog-to-digital converter (ADC) is operatively connected to the at least one first antenna, a receive (Rx) filter, wherein the receive (Rx) filter is operatively connected to the analog-to-digital converter (ADC), a first transmit (Tx) filter, wherein the first transmit (Tx) filter is operatively connected to the receive (Rx) filter, a digital-to-analog converter (DAC), wherein the digital-to-analog converter (DAC) is operatively connected to the first transmit (Tx) filter, at least one second antenna, wherein the at least one second antenna is operatively connected to the first transmit (Tx) filter, and a feedback channel, wherein the feedback channel is wirelessly connected to both the at least one second antenna and the at least one first antenna. According to further features of the described embodiment of the present invention the repeater system, includes a digital signal processor that contains: a cancellation filter, an adder, wherein the adder is operatively connected between the receive (Rx) filter and the at least one transmit (Tx) filter and is further operatively connected to the cancellation filter, a cancellation filter control, wherein the cancellation filter control is operatively connected to the adder and the cancellation filter, a training signal generator, a splitting point, wherein the splitting point is operatively connected to the cancellation filter, a switch, wherein the switch is operatively connected to the training signal generator, the first one transmit (Tx) filter and to the splitting point; and a second transmit (Tx) filter, wherein the second transmit (Tx) filter is operatively connected to the splitting point and to the digital-to-analog converter (DAC).

According to a second embodiment of the present invention there is provided a repeater system including: a first antenna, a first duplexer, wherein the first duplexer is operatively connected to the first antenna, an uplink block, wherein the uplink block is operatively connected to the first duplexer, a downlink block, wherein the downlink block is operatively connected to the first duplexer, a second duplexer, wherein the second duplexer is operatively connected to the uplink block and to the downlink block and a second antenna, wherein the second antenna is operatively connected to the second duplexer.

According to further features of the described embodiment of the present invention the repeater system further includes: a mixed-signal processor (MSP), wherein the mixed-signal processor (MSP) is operatively connected to the uplink block and to the downlink block.

According to further features of the described embodiment of the present invention the repeater system further includes: a first mixed-signal processors (MSP), wherein the first mixed-signal processor (MSP) is operatively connected to the uplink block; and a second mixed-signal processor (MSP), wherein the second mixed-signal processor (MSP) is operatively connected to the downlink block.

According to further features of the described embodiment of the present invention the uplink block of the repeater system includes: a low noise amplifier (LNA), an analog frequency converter (AFC), wherein the analog frequency converter (AFC) is operatively connected to the low noise amplifier (LNA) and a power amplifier (PA), wherein the power amplifier (PA) is operatively connected to the analog frequency converter (AFC).

According to further features of the described embodiment of the present invention the uplink block of the repeater further includes: a mixed-signal processor (MSP), wherein the mixed-signal processor (MSP) is operatively connected to the analog frequency converter (AFC).

According to further features of the described embodiment of the present invention the downlink block of the repeater system includes: a low noise amplifier (LNA), an analog frequency converter (AFC), wherein the analog frequency converter is operatively connected to the low noise amplifier (LNA) and a power amplifier (PA), wherein the power amplifier (PA) is operatively connected to the analog frequency converter (AFC).

According to further features of the described embodiment of the present invention the downlink block of the repeater system further includes: a mixed-signal processor (MSP), wherein the mixed-signal processor (MSP) is operatively connected to the analog frequency converter (AFC).

According to further features of the described embodiment of the present invention the mixed-signal processor (MSP) of the repeater system further includes: an analog-to-digital converter (ADC), a digital down-converter (DDC), wherein the digital down-converter (DDC) is operatively connected to the analog-to-digital converter (ADC), a receive (Rx) filter, wherein the receive (Rx) filter is operatively connected to the digital down-converter (DDC), an adder, wherein the adder is operatively connected to the receive (Rx) filter, a configurable multi-band filter, wherein the configurable multi-band filter is operatively connected to the adder, a control central processing unit, wherein the control central processing unit is operatively connected to the configurable multi-band filter, a training signal generator, a splitting point, a switch, wherein the switch is operatively connected to the training signal generator, the configurable multi-band filter and to the splitting point, a transmit (Tx) filter, wherein the transmit (Tx) filter is operatively connected to the splitting point, a digital up-converter (DUC), wherein the digital up-converter (DUC) is operatively connected to the transmit (Tx) filter, a digital-to-analog converter (DAC), wherein the digital-to-analog converter (DAC) is operatively connected to the digital up-converter (DUC), a cancellation filter, wherein the cancellation filter is operatively connected to the adder and to the splitting point and an estimation algorithm execution unit, wherein the estimation algorithm execution unit is operatively connected to the adder, the cancellation filter and the training signal generator.

According to further features of the described embodiment of the present invention the repeater system further includes: a first mixed-signal processor (MSP), wherein the first mixed-signal processor (MSP) is operatively connected to the uplink block, and a second mixed-signal processor (MSP), wherein the second mixed-signal processor (MSP) is operatively connected to the downlink block.

According to further features of the described embodiment of the present invention the first mixed-signal processor (MSP) of the repeater system includes: an analog-to-digital converter (ADC) a digital down-converter (DDC), wherein the digital down-converter (DDC) is operatively connected to the analog-to-digital converter (ADC), a receive (Rx) filter, wherein the receive (Rx) filter is operatively connected to the digital down-converter (DDC), an adder, wherein the adder is operatively connected to the receive (Rx) filter, a configurable multi-band filter, wherein the configurable multi-band filter is operatively connected to the adder, a control central processing unit, wherein the control central processing unit is operatively connected to the configurable multi-band filter, a training signal generator, a splitting point, a switch, wherein the switch is operatively connected to the training signal generator, the configurable multi-band filter and to the splitting point, a transmit (Tx) filter, wherein the transmit (Tx) filter is operatively connected to the splitting point, a digital up-converter (DUC), wherein the digital up-converter (DUC) is operatively connected to the transmit (Tx) filter, a digital-to-analog converter (DAC), wherein the digital-to-analog converter (DAC) is operatively connected to the digital up-converter (DUC), a cancellation filter, wherein the cancellation filter is operatively connected to the adder and to the splitting point and an estimation algorithm execution unit, wherein the estimation algorithm execution unit is operatively connected to the adder, the cancellation filter and the training signal generator and wherein the second mixed-signal processor (MSP) includes: an analog-to-digital converter (ADC), a digital down-converter (DDC), wherein the digital down-converter (DDC) is operatively connected to the analog-to-digital converter (ADC), a receive (Rx) filter, wherein the receive (Rx) filter is operatively connected to the digital down-converter (DDC), an adder, wherein the adder is operatively connected to the receive (Rx) filter, a configurable multi-band filter, wherein the configurable multi-band filter is operatively connected to the adder, a control central processing unit, wherein the control central processing unit is operatively connected to the configurable multi-band filter, a training signal generator, a splitting point, a switch, wherein the switch is operatively connected to the training signal generator, the configurable multi-band filter and to the splitting point, a transmit (Tx) filter, wherein the transmit (Tx) filter is operatively connected to the splitting point, a digital up-converter (DUC), wherein the digital up-converter (DUC) is operatively connected to the transmit (Tx) filter, a digital-to-analog converter (DAC), wherein the digital-to-analog converter (DAC) is operatively connected to the digital up-converter (DUC), a cancellation filter, wherein the cancellation filter is operatively connected to the adder and to the splitting point and an estimation algorithm execution unit, wherein the estimation algorithm execution unit is operatively connected to the adder, the cancellation filter and the training signal generator.

Additional objects and advantages of the invention will be set forth in part in the description which follows and, in part, will be obvious from the description, or may be learned by practice of the invention.

BRIEF DESCRIPTION OF THE DRAWINGS

The invention is herein described, by way of example only, with reference to the accompanying drawings, wherein.

DETAILED DESCRIPTION OF EMBODIMENTS

Figure 1:
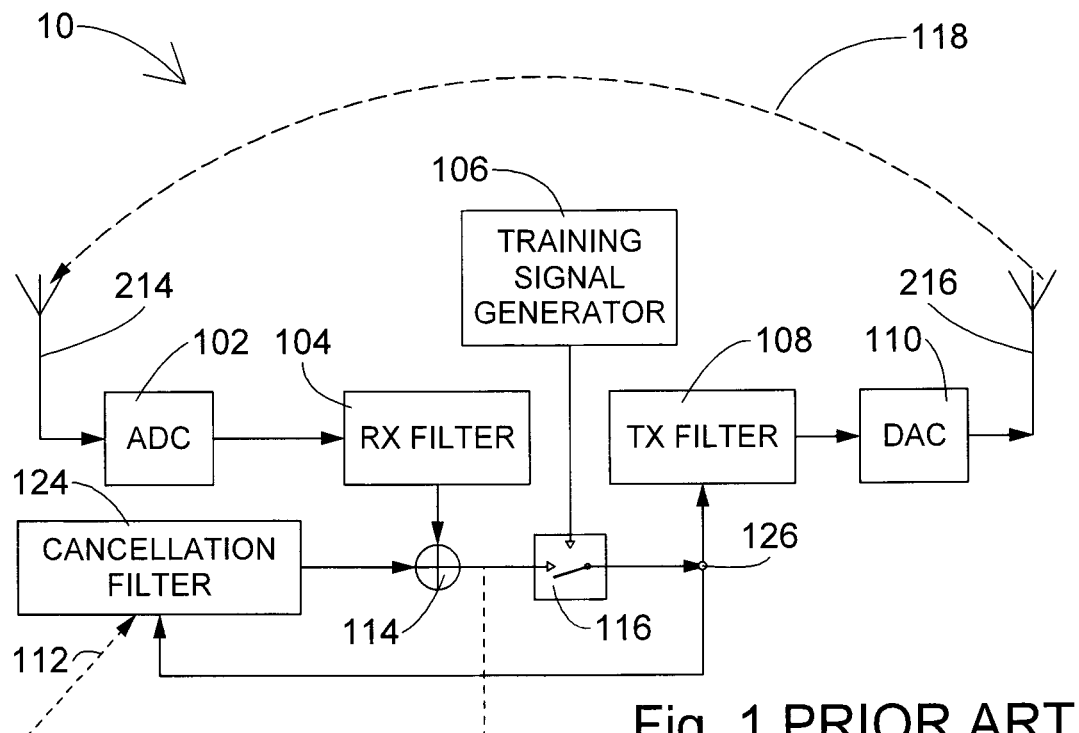
FIG. 1 of the prior art is a schematic block diagram of a first typical prior art repeater system (PARS) which uses echo cancellation to overcome the feedback loop.
Figure 2:
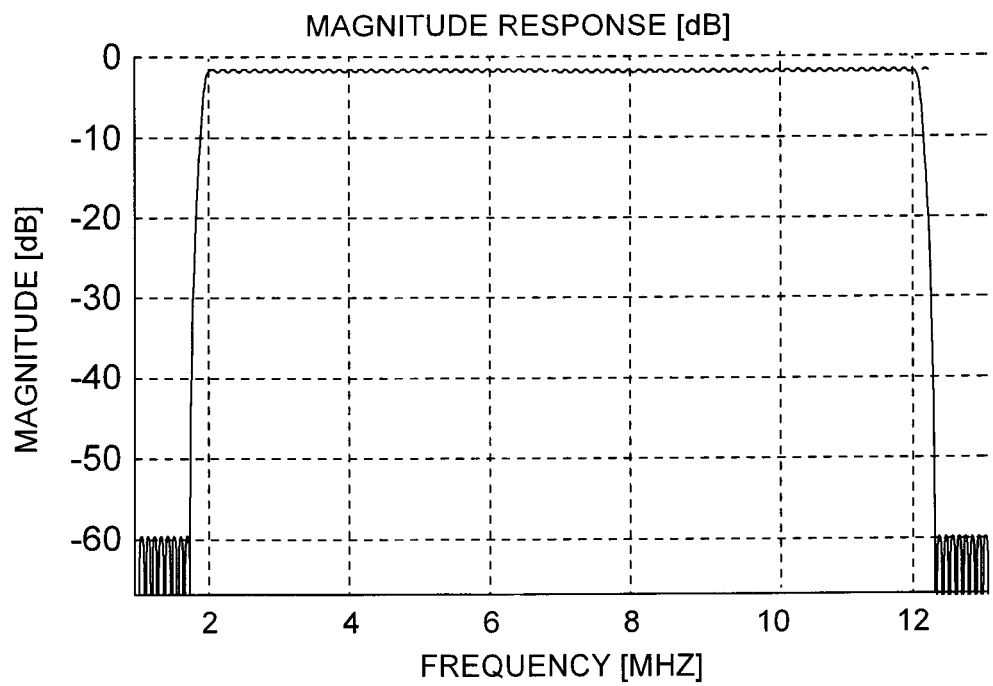
FIG. 2 of the prior art is an example of a first typical band-pass filter magnitude response graph.
Figure 3:
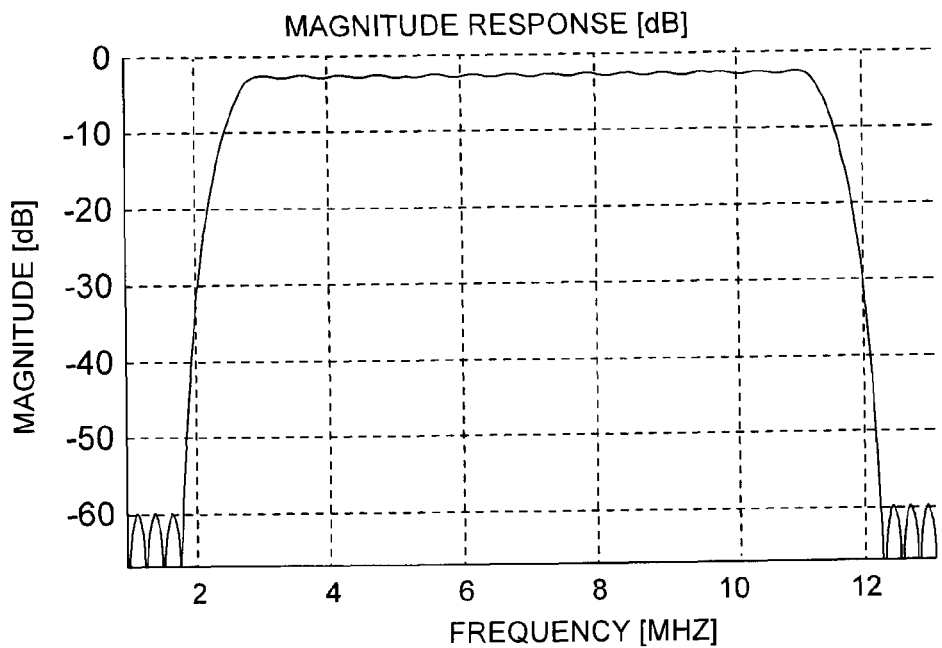
FIG. 3 of the prior art is an example of a second typical band-pass filter magnitude response graph.
Figure 4:
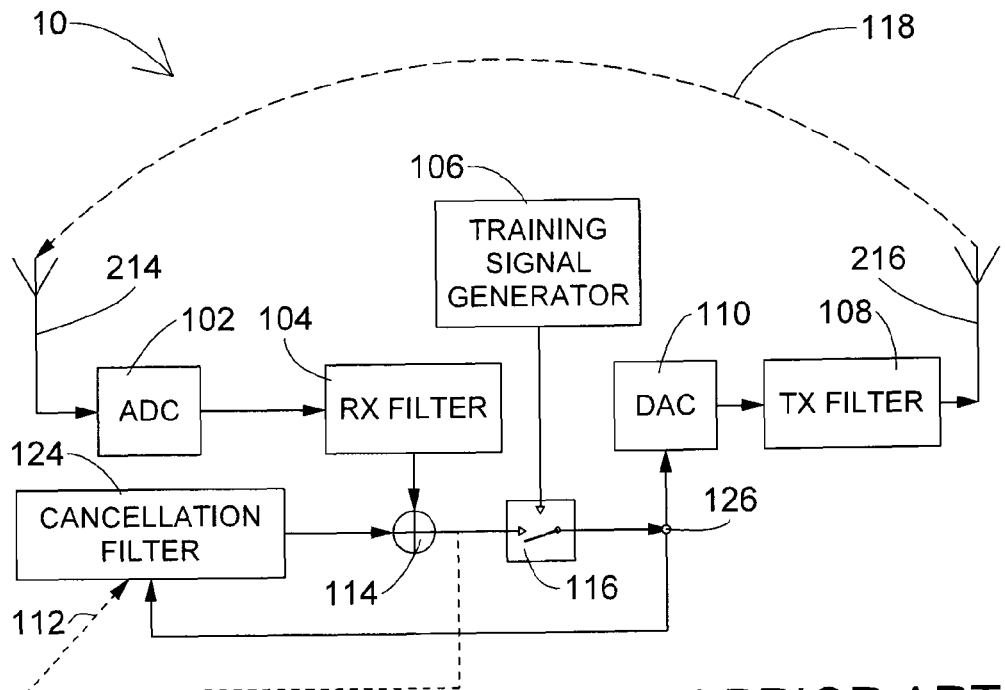
FIG. 4 of the prior art is an example of a second prior art repeater system (PARS) which uses echo cancellation to overcome the feedback loop.

The present invention is of a repeater system.

The principles and operation of a repeater system according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings.

Unless otherwise defined, all technical and scientific terms used herein have the same meaning as commonly understood by one of ordinary skill in the art to which this invention belongs. The materials, dimensions, methods, and examples provided herein are illustrative only and are not intended to be limiting.

Figure 5:
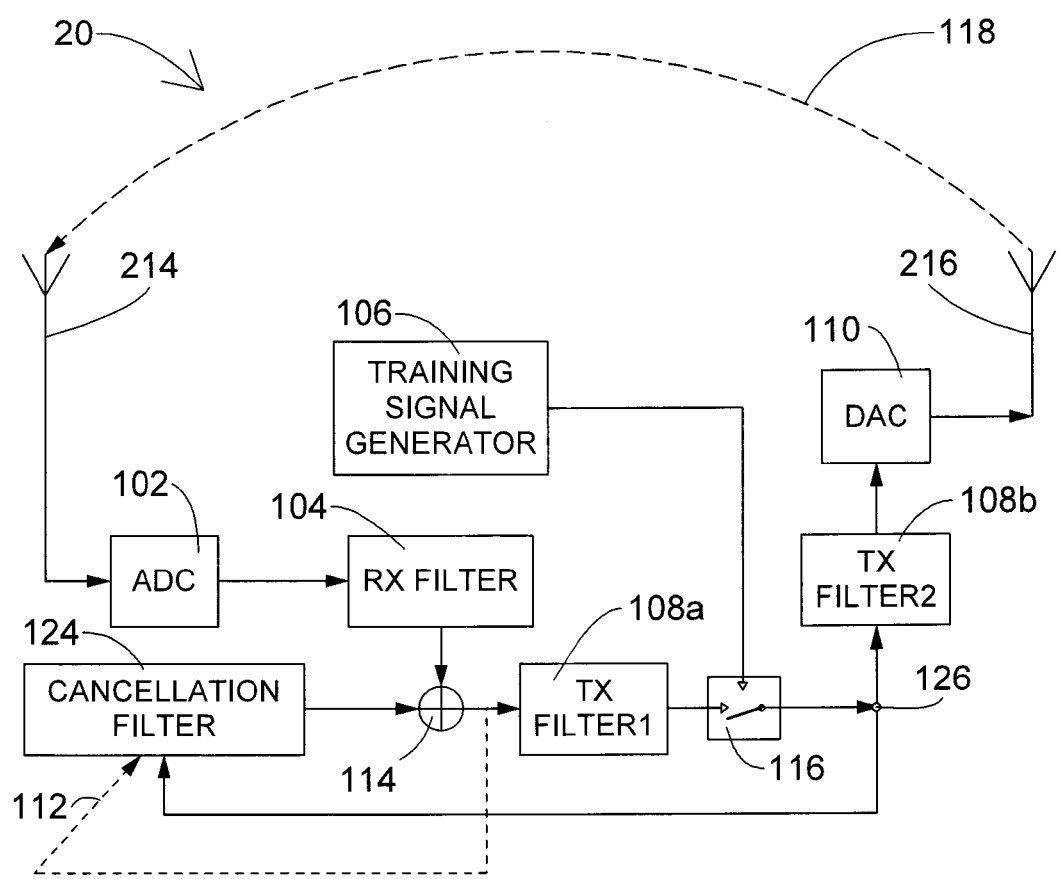
FIG. 5 is a schematic block diagram of a first embodiment of a repeater system which uses echo cancellation to overcome the feedback loop, including two Tx filters, according to the present invention.

The following list is a legend of the numbering of the application illustrations:
10 prior art repeater system (PARS)
20 repeater system
102 analog-to-digital converter (ADC)
104 receive (Rx) filter
106 training signal generator
108 transmit (Tx) filter
108a first transmit (Tx) filter
108b second transmit (Tx) filter
110 digital-to-analog converter (DAC)
112 cancellation filter control
114 adder
116 switch
118 feedback channel
124 cancellation filter
126 splitting point
200 duplexer
202 low noise amplifier (LNA)
204 analog frequency converter (AFC)
206 power amplifier (PA)
208 mixed-signal processor (MSP)
210 uplink block
212 downlink block
214 first antenna
216 second antenna
300 digital down-converter (DDC)
302 control central processing unit (CPU)
304 configurable multi-band filter
306 digital up-converter (DUC)
308 estimation algorithm execution unit Referring now to the drawings, FIG. 5 is a schematic block diagram of a first embodiment of a repeater system 20 which uses echo cancellation to overcome the feedback loop, including two Tx filters, according to the present invention.

In the present embodiment, the Tx filter 108 of the prior are is divided into two Tx filters; a first transmit (Tx) filter 108a and a second transmit (Tx) filter 108b. Putting the splitting point 126 after the first transmit (Tx) filter 108a allows for the cancellation filter 124 to estimate only the second transmit (Tx) filter 108b. With the first transmit (Tx) filter 108a designed as a very sharp band-pass filter, the second transmit (Tx) filter 108b can be a very soft band-pass filter and therefore a very simple filter. Therefore, the cancellation filter 124 can now be designed as a soft band-pass filter as well.

The term "sharp" is used here to infer that the filter has a high rejection ratio (usually more than 20 dBc at 1 MHz from the corner frequency, up to 40 dBc at 600 KHz from the corner frequency), and "soft" is used here to infer that the filter has a lower rejection ratio (usually 10 dBc at 5 MHz from the corner frequency up to 20 dBc at 6 MHz from corner frequency).

When the second transmit (Tx) filter 108b is placed before the digital-to-analog converter (DAC) 110 as described in the present illustration, it is a digital filter (typically, a FIR filter). In case the second transmit (Tx) filter 108b is placed after the digital-to-analog converter (DAC) 110 it is an analog filter (typically a SAW filter).

If the input signal level is sufficient the training can be performed, in wide band modulations (i.e. code division multiple access (CDMA), wideband code division multiple access (WCDMA), orthogonal frequency-division multiplexing (OFDM) etc.) without using white noise as a training signal namely the incoming transmissions can be used as a training signal and perform estimation or adaptation without stopping the system operation and without interrupting nearby communications.

Even though the present embodiment (as well as the following embodiments) are described using separate functional blocks, it is possible to implement all of the blocks within a single device such as a field programmable gate array (FPGA) or an application specific integrated circuit (ASIC).

Figure 6:
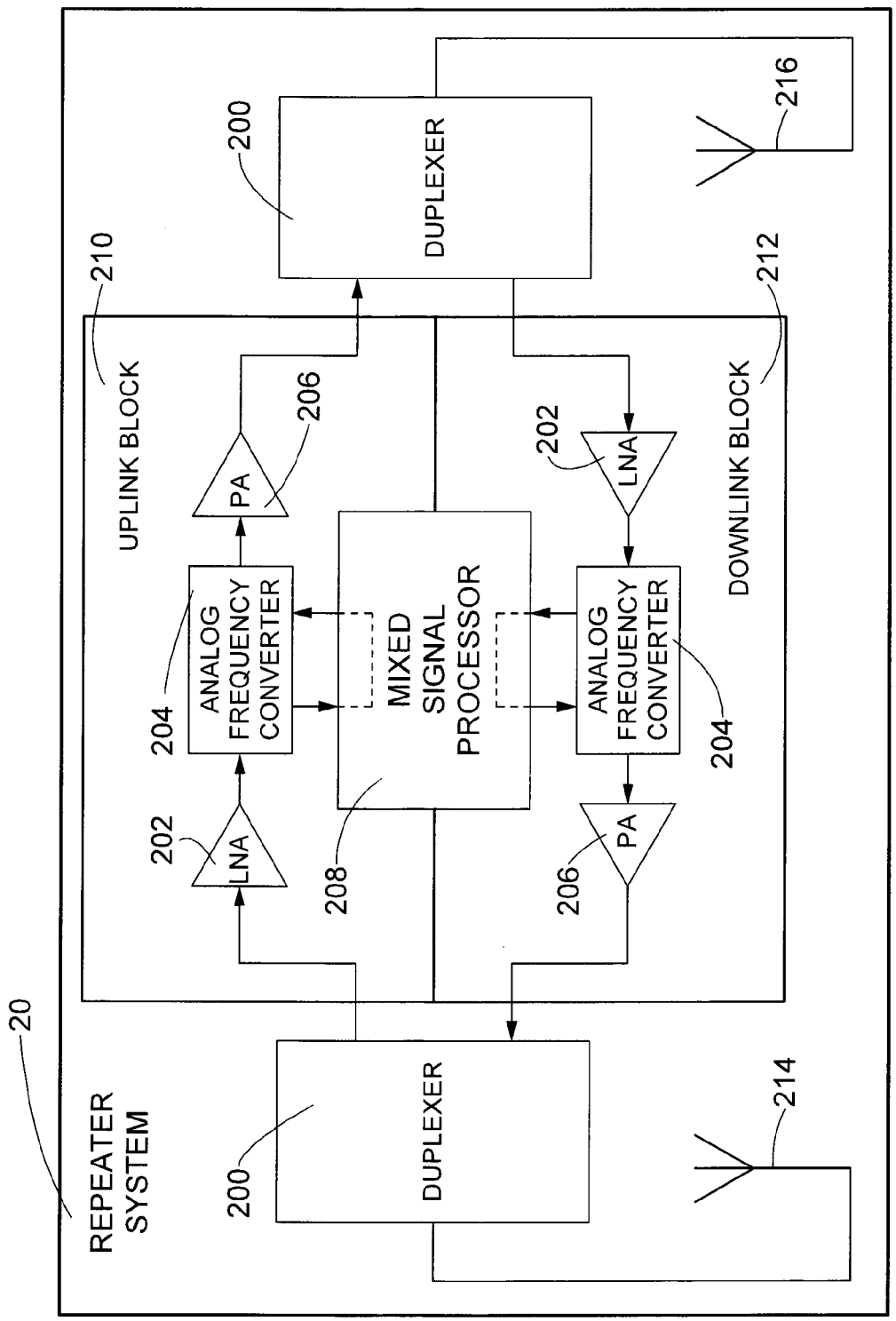
FIG. 6 is a schematic block diagram of a second embodiment of repeater system which uses echo cancellation to overcome the feedback loop, according to the present invention.

FIG. 6 is a schematic block diagram of a second embodiment of repeater system 20 which uses echo cancellation to overcome the feedback loop, according to the present invention.

In the present embodiment, a signal is received by one of the two antennas (either the first antenna 214 or the second antenna 216, depending on the transmission direction—upstream or downstream) and using a duplexer 200, the signal is transferred to the appropriate block (an uplink block 210 or a downlink block 212) for processing and using another duplexer 200, the signal is transferred to the other antenna for transmitting.

The operational principles of the uplink block 210 and the downlink block 212 are alike and thus only a single block is described, as follows.

Once the signal arrives from the duplexer 200, it is amplified by the low noise amplifier (LNA) 202 in order to have a higher gain signal with better signal-to-noise ratio (SNR) which is easier to work with. The amplified signal is converted into a lower frequency, using the analog frequency converter (AFC) 204, to a frequency range which is easier to convert into a digital signal later on in the process. The signal is then input into the mixed-signal processor (MSP) 208, for processing (e.g., echo cancellation, filtration etc.). From the mixed-signal processor (MSP) 208 the processed signal is converted back into a high frequency (RF) signal using the analog frequency converter (AFC) 204 so that it can be amplified by the power amplifier (PA) 206 and transmitted through the other antenna (by way of the other duplexer 200).

The mixed-signal processor (MSP) 208 in the present embodiment is a single block, shared by both the uplink block 210 and the downlink block 212.

Figure 7:
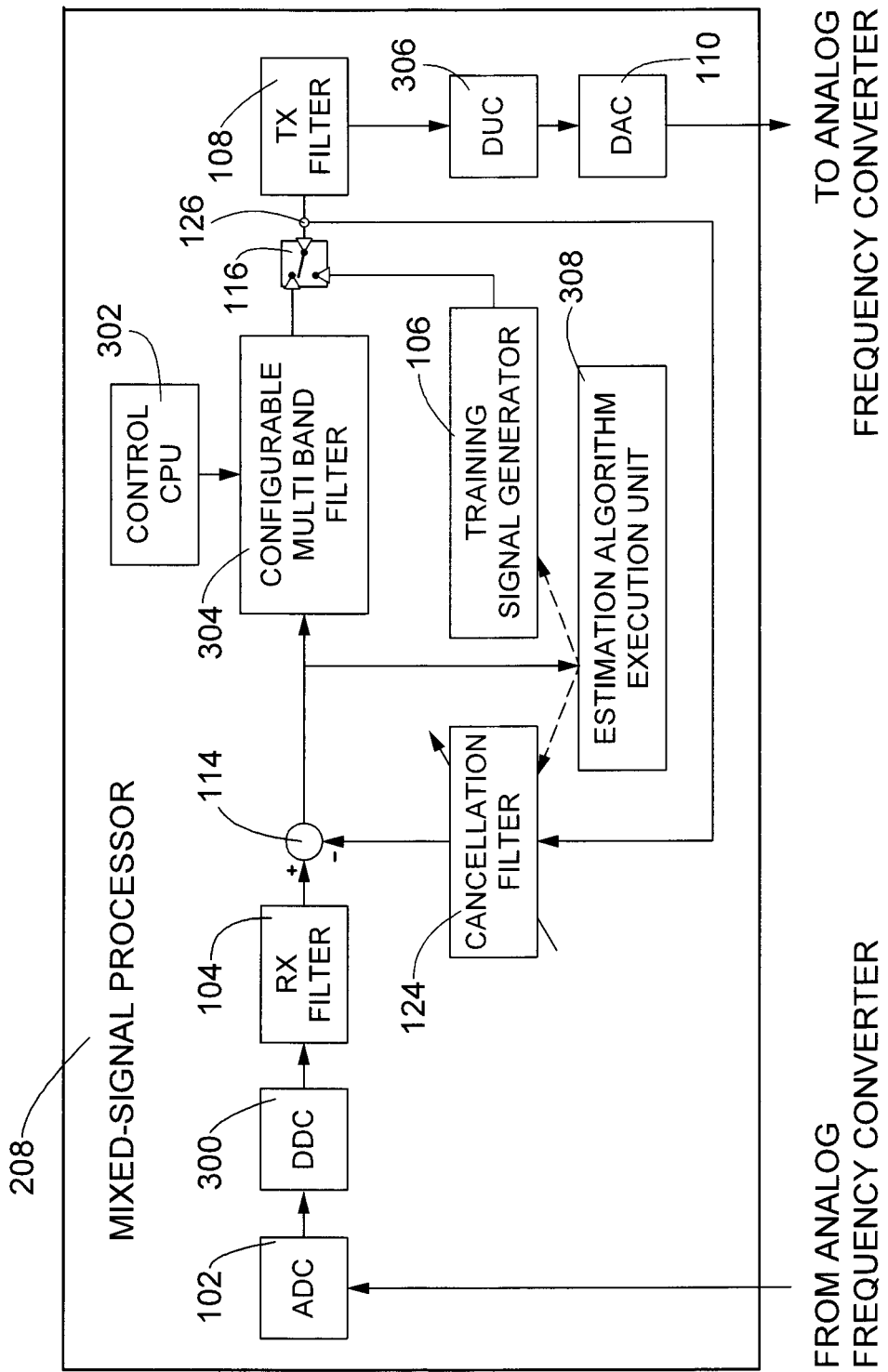
FIG. 7 is a schematic block diagram of a mixed-signal processor (MSP), according to the present invention.

FIG. 7 is a schematic block diagram of a mixed-signal processor (MSP) 208, according to the present invention.

The present illustration describes a mixed-signal processor (MSP) 208 for a single uplink block 210 or downlink block 212 (both not shown in the present figure, shown in FIG. 6). Other embodiments may have a dual block mixed-signal processor (MSP) 208 in which there are two identical structures as the single structure depicted herein.

A signal comes into the mixed-signal processor (MSP) 208 from the analog frequency converter (AFC) 204 (not shown in the present figure, shown in FIG. 6) and is converted to a digital signal using an analog-to-digital converter (ADC) 102 and is then down-converted to a lower frequency using a digital down-converter (DDC) 300. The signal is filtered with the Rx filter 104 to remove any noises it may have picked up and is moved to the adder 114 where the cancellation signal from the cancellation filter 124 is subtracted from it. The subtracted signal is filtered by the configurable multi band filter 304 (which functions like the first transmit (Tx) filter 108a of the repeater system 20 depicted in FIG. 6. In normal operation mode, the switch 116 transfers the filtered signal to the Tx filter 108 which is then up-converted using a digital up-converter (DUC) 306, converted to an analog signal using the digital to analog (DAC) 110 and transmitted back to the analog frequency converter (AFC) 204 (not shown in the present figure, shown in FIG. 6).

In the training mode the switch 116 connects the training signal generator 106 to the transmit path (from the Tx filter 108 onwards) in order to train the repeater system 20 in echo cancellation as described before in FIG. 5.

An estimation algorithm execution unit 308 receives the subtracted signal coming out of the adder 114 and can improve on the existing manner of controlling the cancellation filter 124 by providing optional computation possibilities to the repeater system 20.

The estimation algorithm execution unit 308 can also control the training signal generator 106 in order to use different types of training signals for use in different types of wireless communication protocols and frequency bands. In cases in which the incoming communication signals that pass through the system are sufficiently high and consist of wide-bands modulations (such as CDMA, WCDMA etc.), the estimation algorithm can use these signals to perform estimation and adaptation of the cancellation filter.

The estimation algorithm execution unit 308 may also analyze the incoming signal for out-of-band noises in order to adjust the cancellation filter so that it would filter out any out-of-band noises. This estimation can be done continuously even in normal operation mode and not just in the training mode.

One possible algorithm that can be used as the estimation algorithm execution unit 308 is the well known Least-Mean-Square (LMS) algorithm to find the transfer function H(t) that minimizes $\Sigma[\text{Noise}'(t)-H(\text{Noise}(t))]^2$ where Noise(t) is the transmit noise through from the output and Noise'(t) is the receive noise from the input. The Noise (t) can be either an internal wide-band noise, or (in cases of wide-band modulations), the communication signal itself.

The configurable multi band filter 304 may include more than one band-pass filter for applications which use multiple frequency bands. The band-pass filters within the configurable multi band filter 304 are controlled and programmed by a control central processing unit (CPU) 302.

Figure 8:
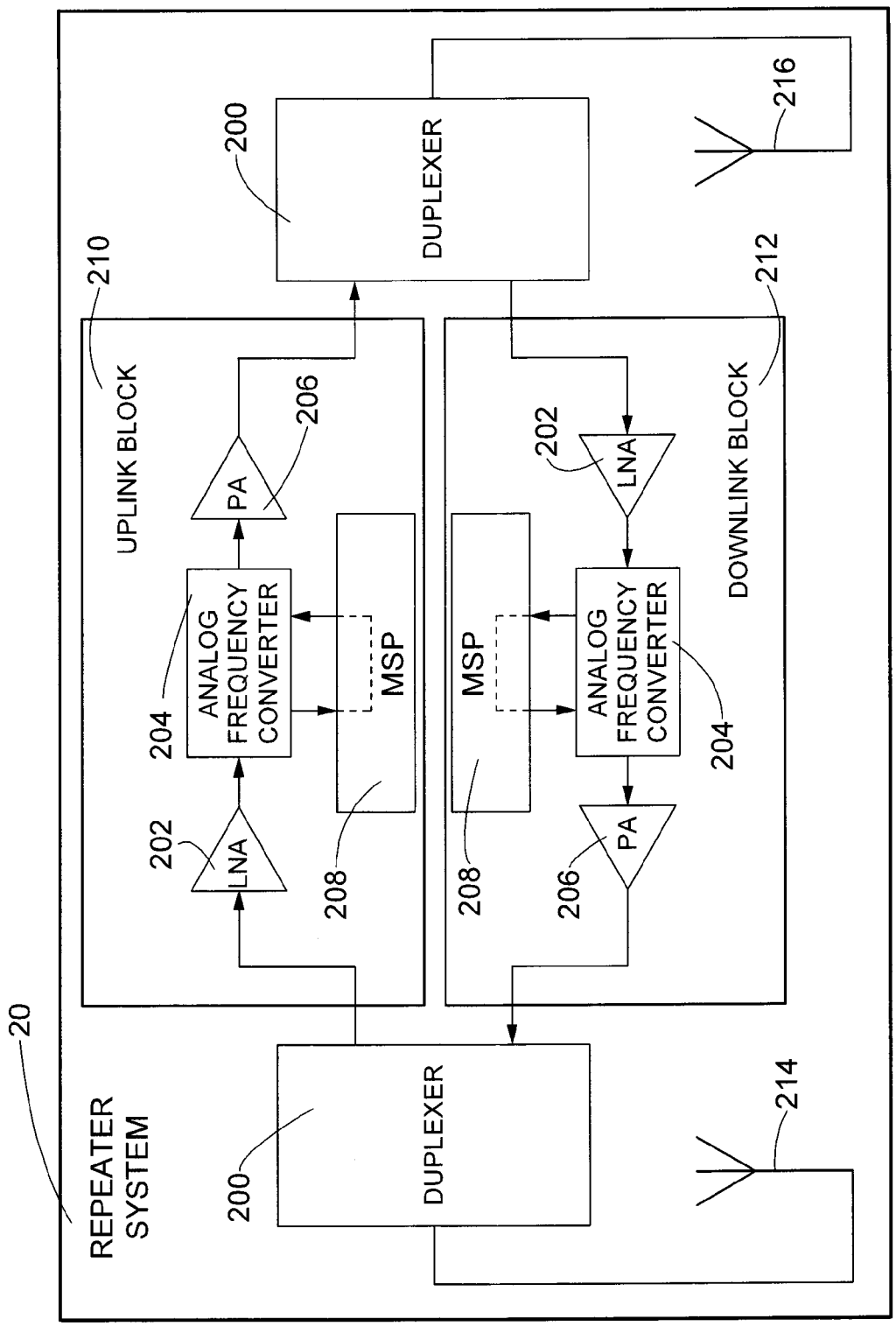
FIG. 8 is a schematic block diagram of a third embodiment of repeater system (MSP) which uses echo cancellation to overcome the feedback loop, according to the present invention.

FIG. 8 is a schematic block diagram of a third embodiment of repeater system 20 which uses echo cancellation to overcome the feedback loop, according to the present invention.

In the present embodiment, a signal is received by one of the two antennas (either the first antenna 214 or the second antenna 216, depending on the transmission direction—upstream or downstream) and using a duplexer 200, the signal is transferred to the appropriate block (an uplink block 210 or a downlink block 212) for processing and using another duplexer 200, the signal is transferred to the other antenna for transmitting.

The operational principles of the uplink block 210 and the downlink block 212 are alike and thus only a single block is described, as follows.

Once the signal arrives from the duplexer 200, it is amplified by the low noise amplifier (LNA) 202 in order to have a higher gain signal with better signal-to-noise ratio (SNR) which is easier to work with. The amplified signal is converted into a lower frequency, using the analog frequency converter (AFC) 204, to a frequency range which is easier to convert into a digital signal later on in the process. The signal is then input into the mixed-signal processor (MSP) 208, for processing (e.g., echo cancellation, filtration etc.). From the mixed-signal processor (MSP) 208 the processed signal is converted back into a high frequency (RF) signal using the analog frequency converter (AFC) 204 so that it can be amplified by the power amplifier (PA) 206 and transmitted through the other antenna (by way of the other duplexer 200).

The present embodiment includes two separate mixed-signal processor (MSP) 208 units; one for the uplink block 210 and one for the downlink block 212.

While the invention has been described with respect to a limited number of embodiments, it will be appreciated that many variations, modifications and other applications of the invention may be made.

What is claimed is:

1. A repeater system, comprising:
   (a) a first antenna;
   (b) a first duplexer, wherein said first duplexer is operatively connected to said first antenna;
   (c) an uplink block, wherein said uplink block is operatively connected to said first duplexer;
   (d) a downlink block, wherein said downlink block is operatively connected to said first duplexer;
   (e) a second duplexer, wherein said second duplexer is operatively connected to said uplink block and to said downlink block;
   (f) a second antenna, wherein said second antenna is operatively connected to said second duplexer;
   (g) a mixed signal processor (MSP) comprising a first mixed-signal processor (MSP) operatively connected to said uplink block and a second mixed-signal processor (MSP) operatively connected to said downlink block; wherein said first mixed-signal processor (MSP) and said second mixed-signal processor (MSP) further comprise:
      (i) an analog-to-digital converter (ADC);
      (ii) a digital down-converter (DDC), wherein said digital down-converter (DDC) is operatively connected to said analog-to-digital converter (ADC);
      (iii) a receive (Rx) filter, wherein said receive (Rx) filter is operatively connected to said digital down-converter (DDC);
      (iv) an adder, wherein said adder is operatively connected to said receive (Rx) filter:
      (v) a configurable multi-band filter, wherein said configurable multi-band filter is operatively connected to said adder;
      (vi) a control central processing unit, wherein said control central processing unit is operatively connected to said configurable multi-band filter:
      (vii) a training signal generator;
      (viii) a splitting point;

(ix) a switch, wherein said switch is operatively connected to said training signal generator, said configurable multi-band filter and to said splitting point;
(x) a transmit (Tx) filter, wherein said transmit (Tx) filter is operatively connected to said splitting point;
(xi) a digital up-converter (DUC), wherein said DUC is operatively connected to said transmit (Tx) filter;
(xii) a digital-to-analog converter (DAC), wherein said digital-to-analog converter (DAC) is operatively connected to said digital up-down converter (DUC);
(xiii) a cancellation filter, wherein said cancellation filter is operatively connected to said adder and to said splitting point; and,
(xiv) an estimation algorithm execution unit, wherein said estimation algorithm execution unit is operatively connected to said adder, said cancellation filter and said training signal generator.

2. The repeater system of claim 1 wherein said uplink block includes: (i) a low noise amplifier (LNA); (ii) an analog frequency converter (AFC), wherein said analog frequency converter (AFC) is operatively connected to said LNA; and (iii) a power amplifier (PA), wherein said power amplifier (PA) is operatively connected to said analog frequency converter (AFC).

3. The repeater system of claim 2 wherein said uplink block further includes: (iv) a mixed-signal processor (MSP), wherein said mixed-signal processor (MSP) is operatively connected to said analog frequency converter (AFC).

4. The repeater system of claim 1 wherein said downlink block includes: (i) a low noise amplifier (LNA); (ii) an analog frequency converter (AFC), wherein said analog frequency converter (AFC) is operatively connected to said LNA; and (iii) a power amplifier (PA), wherein said power amplifier (PA) is operatively connected to said analog frequency converter (AFC).

5. The repeater system of claim 4 wherein said downlink block further includes: (iv) a mixed-signal processor (MSP), wherein said mixed-signal processor (MSP) is operatively connected to said analog frequency converter (AFC).

6. A repeater system comprising:
(a) a first antenna;
(b) a first duplexer, wherein said first duplexer is operatively connected to said first antenna;
(c) an uplink block, wherein said uplink block is operatively connected to said first duplexer;
(d) a downlink block, wherein said downlink block is operatively connected to said first duplexer;
(e) a second duplexer, wherein said second duplexer is operatively connected to said uplink block and to said downlink block;
(f) a second antenna, wherein said second antenna is operatively connected to said second duplexer;
(g) a first mixed-signal processor (MSP), wherein said first mixed-signal processor (MSP) is operatively connected to said uplink block, wherein said first mixed-signal processor (MSP) further comprises:
(i) an analog-to-digital converter (ADC);
(ii) a digital down-converter (DDC), wherein said digital down-converter (DDC) is operatively connected to said analog-to-digital converter (ADC);
(iii) a receive (Rx) filter, wherein said receive (Rx) filter is operatively connected to said digital down-converter (DDC);
(iv) an adder, wherein said adder is operatively connected to said receive (Rx) filter;
(v) a configurable multi-band filter, wherein said configurable multi-band filter is operatively connected to said adder;
(vi) a control central processing unit, wherein said control central processing unit is operatively connected to said configurable multi-band filter;
(vii) a training signal generator;
(viii) a splitting point;
(ix) a switch, wherein said switch is operatively connected to said training signal generator, said configurable multi-band tilter and to said splitting point;
(x) a transmit (Tx) filter, wherein said transmit (Tx) filter is operatively connected to said splitting point;
(xi) a digital up-converter (DUC), wherein said digital up-converter (DUC) is operatively connected to said transmit (Tx) filter;
(xii) a digital-to-analog converter (DAC), wherein said digital-to-analog converter (DAC) is operatively connected to said digital up-converter (DUC);
(xiii) a cancellation filter, wherein said cancellation filter is operatively connected to said adder and to said splitting point; and
(xiv) an estimation algorithm execution unit, wherein said estimation algorithm execution unit is operatively connected to said adder, said cancellation filter, and said training signal generator;
(h) a second mixed-signal processor (MSP), wherein said second mixed signal processor (MSP), is operatively connected to said downlink block, wherein said second mixed-signal processor (MSP), further comprises:
(i) an analog-to-digital converter (ADC);
(ii) a digital down-converter (DDC), wherein said digital down-converter (DDC) is operatively connected to said analog-to-digital converter (ADC);
(iii) a receive (Rx) filter, wherein said receive (Rx) filter is operatively connected to said digital down-converter (DDC);
(iv) an adder, wherein said adder is operatively connected to said receive (Rx) filter;
(v) a configurable multi-band filter, wherein said configurable multi-band filter is operatively connected to said adder;
(vi) a control central processing unit, wherein said control central processing unit is operatively connected to said configurable multi-band filter;
(vii) a training signal generator;
(viii) a splitting point;
(ix) a switch, wherein said switch is operatively connected to said training signal generator, said configurable multi-band filter and to said splitting point;
(x) a transmit (Tx) filter, wherein said transmit (Tx) tilter is operatively connected to said splitting point;
(xi) a digital up-converter (DUC), wherein said digital up-converter (DUC) is operatively connected to said transmit (Tx) filter;
(xii) a digital-to-analog converter (DAC), wherein said digital-to-analog converter (DAC) is operatively connected to said digital up-converter (DUC),
(xiii) a cancellation filter, wherein said cancellation filter is operatively connected to said adder and to said splitting point; and,
(xiv) an estimation algorithm execution unit, wherein said estimation algorithm execution unit is operatively connected to said adder, said cancellation filter, and said training signal generator.

* * * * *